(12) United States Patent
Tseng (10) Patent No.: US 9,403,568 B2
(45) Date of Patent: Aug. 2, 2016

(54) ADJUSTING STRUCTURE FOR SEATPOST OF BICYCLE

(71) Applicant: GIANT MANUFACTURING CO., LTD., Taichung (TW)

(72) Inventor: Wei-Han Tseng, Hsinchu (TW)

(73) Assignee: GIANT MANUFACTURING CO., LTD., Taichung (TW)

( * ) Notice: Subject to any disclaimer, the term of this patent is extended or adjusted under 35 U.S.C. 154(b) by 0 days.

(21) Appl. No.: 14/250,388

(22) Filed: Apr. 11, 2014

(65) Prior Publication Data

US 2014/0305253 A1 Oct. 16, 2014

(30) Foreign Application Priority Data

Apr. 12, 2013 (TW) .............. 102206728 U
Apr. 12, 2013 (TW) .............. 102206729 U (51) Int. Cl.
*B62K 3/00* (2006.01)
*B62J 1/08* (2006.01)
*B62J 1/06* (2006.01)
*B62K 19/36* (2006.01)

(52) U.S. Cl.
CPC .... *B62J 1/08* (2013.01); *B62J 1/06* (2013.01); *B62J 2001/085* (2013.01); *B62K 19/36* (2013.01); *Y10T 74/20396* (2015.01); *Y10T 74/20438* (2015.01)

(58) Field of Classification Search
CPC ............ B62K 19/36; B62K 3/02; B62J 1/06; B62J 1/08

USPC ...................................... 280/287; 297/215.13
See application file for complete search history.

(56) References Cited

U.S. PATENT DOCUMENTS

| 4,150,851 | A * | 4/1979 | Cienfuegos .............. 297/215.13 |
| 4,807,856 | A * | 2/1989 | Teckenbrock ................ 267/132 |
| 6,729,692 | B1 * | 5/2004 | Chou ......................... 297/463.1 |
| 8,021,278 | B2 * | 9/2011 | Huyck et al. .................... 482/57 |
| 8,480,170 | B2 * | 7/2013 | Lu et al. ................... 297/215.13 |
| 2006/0175792 | A1 * | 8/2006 | Sicz et al. ..................... 280/200 |
| 2007/0000714 | A1 * | 1/2007 | Lin ................................ 180/311 |
| 2011/0187166 | A1 * | 8/2011 | Walsh ....................... 297/215.13 |
| 2013/0328285 | A1 * | 12/2013 | Frohlicher et al. ............. 280/287 |

FOREIGN PATENT DOCUMENTS

| DE | 19630839 | * | 4/1997 |
| DE | 19630839 | A1 | 4/1997 |
| WO | 03104072 | A1 | 12/2003 |
| WO | 2004023937 | A1 | 3/2004 |

* cited by examiner

*Primary Examiner* — Joseph Rocca
*Assistant Examiner* — Marlon Arce
(74) *Attorney, Agent, or Firm* — CKC & Partners Co., Ltd.

(57) ABSTRACT

An adjusting structure for a seatpost of a bicycle includes a telescopic post and at least one adjusting module. The telescopic post includes at least one switch disposed on one end of the telescopic post, wherein the switch is for lengthening or shortening the telescopic post. The adjusting module is disposed on the telescopic post corresponding to the switch and for pushing the switch.

25 Claims, 14 Drawing Sheets

ADJUSTING STRUCTURE FOR SEATPOST OF BICYCLE

RELATED APPLICATIONS

The present application claims priority to Taiwan Application Serial Number 102206728, filed Apr. 12, 2013 and Taiwan Application Serial Number 102206729, filed Apr. 12, 2013, which are herein incorporated by reference.

BACKGROUND

1. Technical Field

The present invention relates to a seatpost of a bicycle. More particularly, the present invention relates to an adjusting structure for a seatpost of a bicycle.

2. Description of Related Art

For bicycle rider, the proper height of the seatpost of bicycle is important, that is, the proper height of the seatpost can enhance the riding efficiency, and the injuried of leg can be prevented. In general, the seatpost is departed with the body of the bicycle on the demand of riders with different height, so that the siders can inset the seatpost to the body of the bicycle in different depth according the height of themselves.

However, is inconvenient to adjust the height of the seatpost that must stop the ride. Especially, for the riders who regularly ride on the uphill and downhill, and have to adjust the height of the seatpost according to different kinds of the riding road.

Hence, there is a seatpost of bicycle which can be adjusted the height thereof during riding. The adjusting device is a lever which disposed around the seatpost (called inner wired type). However, it is also inconvenient and danger for rider to operate the adjusting device around the seatpost which is far from the handle of the bicycle.

Another device for adjusting the height of the seatpost of the bicycle is a wired device (called outer wired type), wherein the rider can adjust the height of the seatpost via the wired device which provides an operating end disposed around the handle of the bicycle. However, if the wire of the wired device is too long and near the wheel of bicycle, it is danger that the wire is easier to be rolled up by the wheel.

Recently, the inner wired type becomes the mainstream for adjusting the height of the seatpost. However, it is hard to apply on different type of bicycle, and the inner space of the body of the bicycle is too small for containing the adjusting device for the seatpost, and could not provide a convenient way for rider to switching the adjusting device. Further, there is a fluid pressure type which for replacing the wired type of the adjusting device. However, the cost of the fluid pressure type is higher, and the structure is more complicated.

SUMMARY

According to an embodiment of the present disclosure, an adjusting structure for a seatpost of a bicycle includes a telescopic post and at least one adjusting module. The telescopic post includes at least one switch disposed on one end of the telescopic post, wherein the switch is for lengthening or shortening the telescopic post. The adjusting module is disposed on the telescopic post corresponding to the switch and for pushing the switch.

According to another embodiment of the present disclosure, an adjusting structure for a seatpost of a bicycle includes a telescopic post, a length adjusting module and a first adjusting module. The length adjusting module is contained in the telescopic post, two ends of the length adjusting module leant against two ends of the telescopic post respectively, wherein the length adjusting module includes at least one switch located on one of the ends of the length adjusting module. The first adjusting module is disposed on one end of the telescopic post and for pushing the switch.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
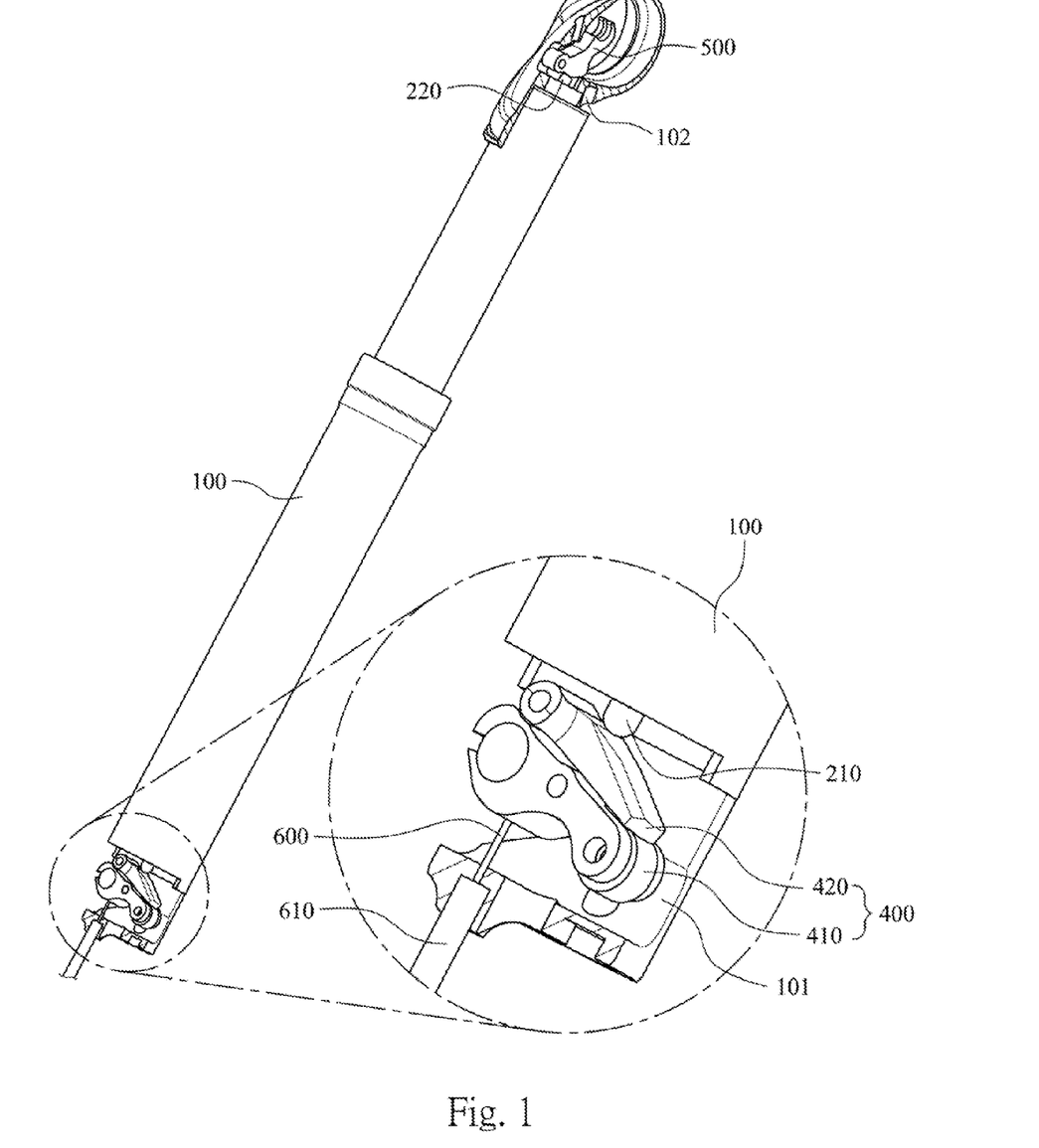
FIG. 1 shows a three dimensional view of an adjusting structure for a seatpost of a bicycle according to one embodiment of the present disclosure.

FIG. 1 shows a three dimensional view of an adjusting structure for a seatpost of a bicycle according to one embodiment of the present disclosure. In FIG. 1, the adjusting structure for the seatpost of the bicycle includes a telescopic post 100 and at least one adjusting module (such as the first adjusting module 400 shown in FIG. 1). The telescopic post 100 includes at least one switch (such as the first switch 210 shown in FIG. 1) disposed on one end (such as first end 101 shown in FIG. 1) of the telescopic post 100, wherein the first switch 210 is for lengthening or shortening the telescopic post 100. The first adjusting module 400 is disposed on the telescopic post 100 corresponding to the first switch 210 and for pushing the first switch 210.

In detail, the first adjusting module 400 in FIG. 1 includes a pushed lever (such as the first pushed lever 420 shown in FIG. 1) and a linking lever (such as the first linking lever 410 shown in FIG. 1). One end of the first pushed lever 420 corresponds to the first switch 210 and can be pivotally connected to the first end 101 of the telescopic post 100. The first linking lever 410 corresponds to the first pushed lever 420 and is pivotally connected to the first end 101 of the telescopic post 100, wherein one end of the first linking lever 410 is driven to swing the other end of the first linking lever 410, and the other end of the first linking lever 410 is linked up with the other end of the first pushed lever 420, thus the other end of the first pushed lever 420 pushes the first switch 210. Moreover, the first adjusting module 400 can also be a lever, a connecting rod, a cam wheel, a roller or a motor, do that the first switch 210 can be pushed for lengthening or shortening the telescopic post 100.

For another example (not be shown) of the embodiment, the first pushed lever 420 of the first adjusting module 400 can be directly connected to the first linking lever 410, that is, the first pushed lever 420 is not pivotally connected to the telescopic post 100. Therefore, the first pushed lever 420 is directly linked up with the first linking lever 410, or the first adjusting module 400 can further includes an assisting rod pivotally connected to the telescopic post 100 and for linked up with the first pushed lever 420 to push the first switch 210, so that the moving track of the first pushed lever 420 can be controlled.

The other end (such as the second end 102 shown in FIG. 1) of the telescopic post 100 can further include a switch (such as the second switch 220 shown in FIG. 1) disposed thereon. The first adjusting module 400 can be detachably disposed on the telescopic post 100, so that the first adjusting module 400 not only can correspond to and control the first switch 210, but also can be disposed on the second end 102 of the telescopic post 100 which corresponds to the second switch 220. Therefore, the second switch 210 can be pushed by the first adjusting module 400 for adjusting the length of the telescopic post 100.

Furthermore, when the first adjusting module 400 is disposed on the first end 101 of the telescopic post 100, the adjusting structure for the seatpost of the bicycle can further include a second adjusting module 500, wherein the second adjusting module 500 corresponds to the second switch 220 and is disposed on the second end 102 of the telescopic post 100 which is for pushing the second switch 220. In FIG. 1, the second adjusting module 500 is a lever. Also, the second adjusting module 500 can also be a connecting rod, a cam wheel, a roller or a motor.

Figure 2:
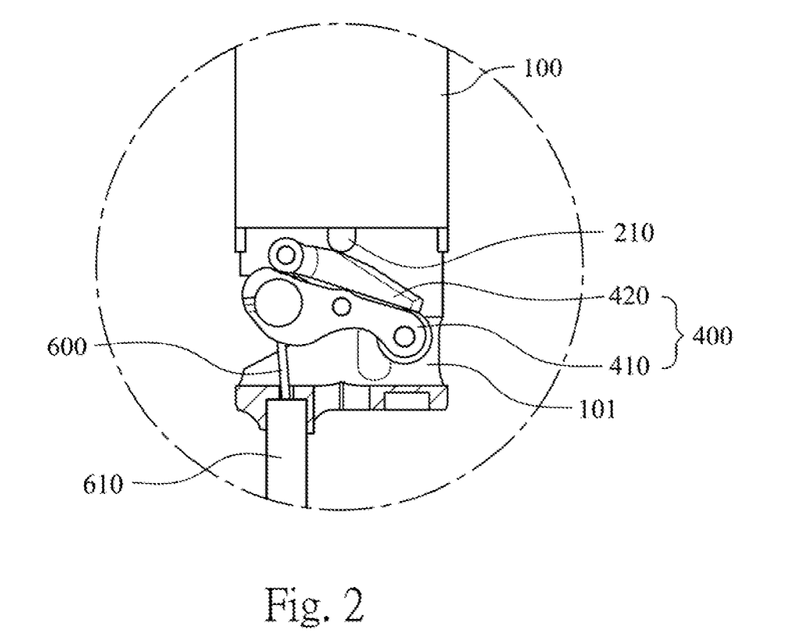
FIG. 2 shows a schematic view of an operating state of the first adjusting module of FIG. 1.
Figure 3:
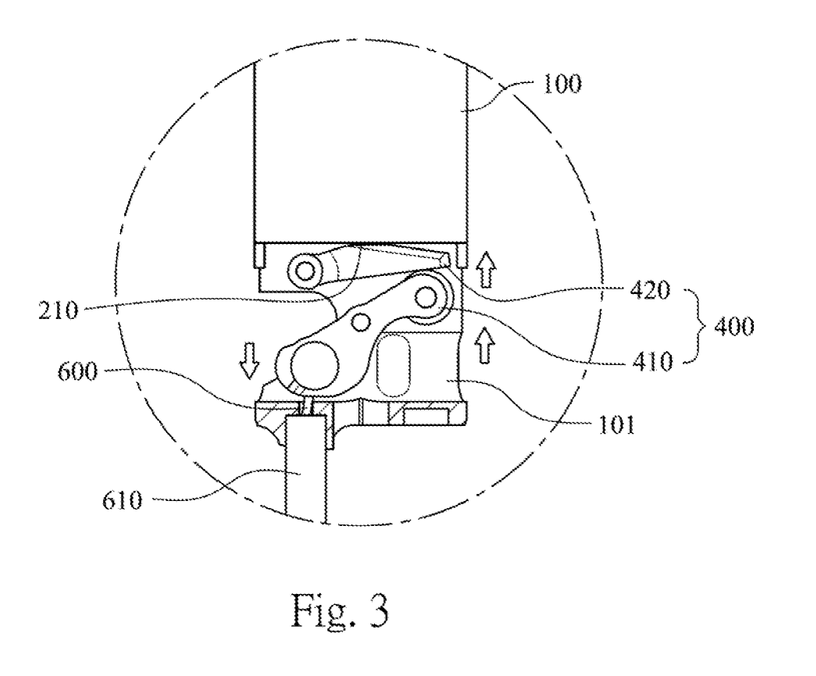
FIG. 3 shows a schematic view of another operating state of the first adjusting module of FIG. 1.

FIG. 2 shows a schematic view of an operating state of the fink adjusting module 400 of FIG. 1. FIG. 3 shows a schematic view of another operating state of the first adjusting module 400 of FIG. 1. The adjusting structure can further include a wire rope 600, wherein one end of the ire rope 600 is detachably connected to the first linking lever 410 of the first adjusting module 400 for pulling the first linking lever 410. In FIG. 2, when the wire rope 600 is not pulled and the first switch 210 of the telescopic post 100 is not be pushed, the length of the telescopic post 100 cannot be adjusted in FIG. 3, when the wire rope 600 is pulled, one end of the first linking lever 410 can be pulled for pushing the first pushed lever 420, and the first pushed lever 420 can push the first switch 210 of the telescopic post 100. Thus, the telescopic post 100 can be lengthened or shortened for adjusting the length (or height) of the seatpost of the bicycle.

The pull of the wire rope 600 can be transformed into the push against the first switch 210 via the first linking lever 410 and the first pushed lever 420. The wire rope 600 can be contained in a cover 610, so that the wire rope 600 can be protected from the effect of the environment. Further, the wire rope 600 can be pulled for linking up with the first linking lever 410 in the cover 610, there is no need to move the cover in the operating state. Therefore, in the operating state, the adjusting structure would not be rubbed against the bicycle, and the external resistance would not be provided, so that the user can operate in an effort-saving situation.

Moreover, the wire rope 600 is detachably connected to the first adjusting module 400. Therefore, the wire rope 600 cam also be connected to the second adjusting module 400 on demand, so that the second adjusting module 400 can be actuated and pushes the second switch 220 for adjusting the length of the telescopic post 100.

Figure 4:
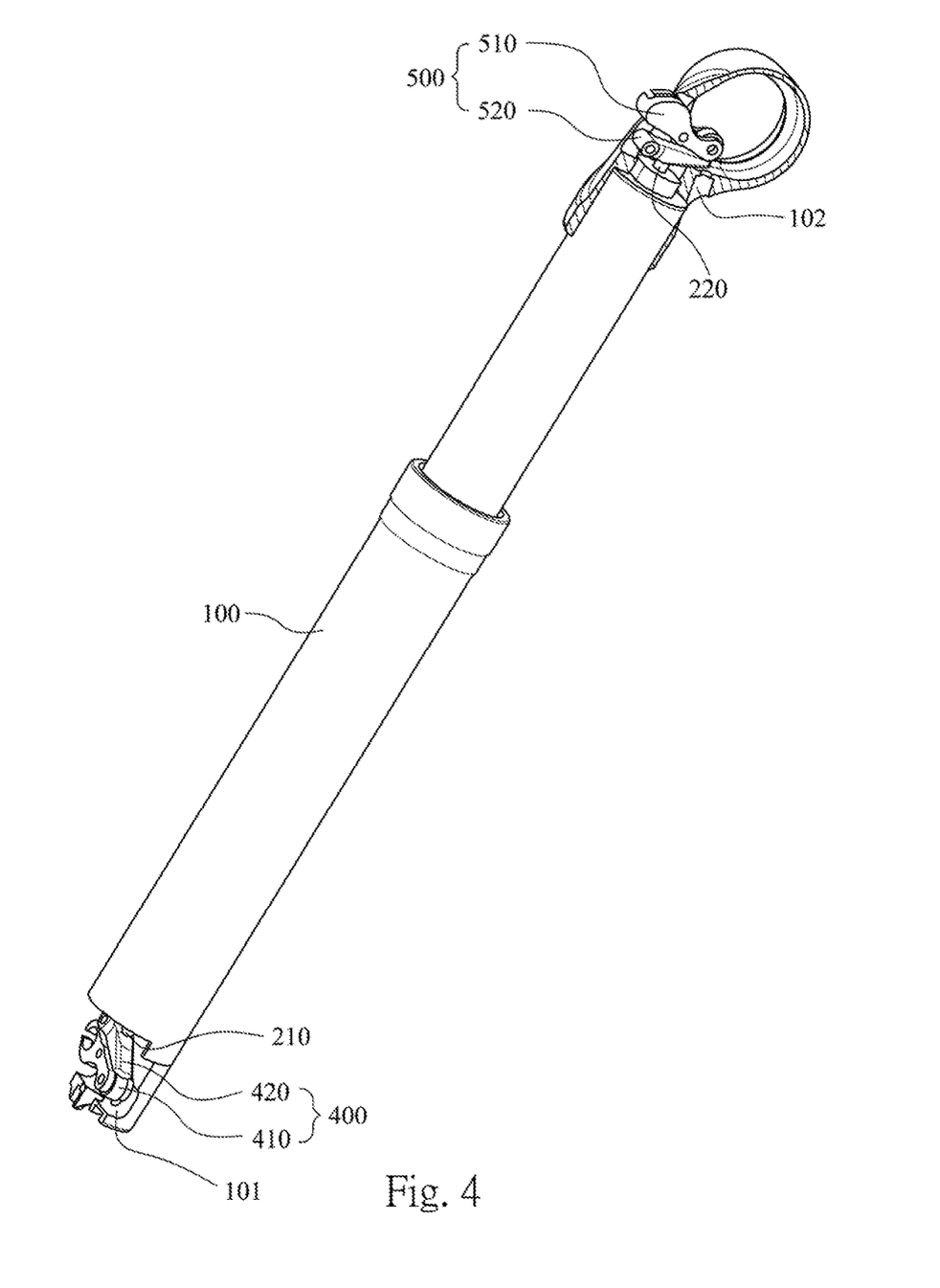
FIG. 4 shows a schematic view of a second adjusting module of the adjusting structure for the seatpost of the bicycle of FIG. 1.

FIG. 4 shows a schematic view of a second adjusting module 500 of the adjusting structure for the seatpost of the bicycle of FIG. 1. In FIG. 4, the second adjusting module 500 includes a second linking lever 510 and a second pushed lever 520. The second linking lever 510 can be pivotally connected to the second end 102 of the telescopic post 100, one end of the second linking lever 510 is driven to swing the other end of the second linking lever 510. One end of the second pushed lever 520 corresponds to second linking lever 510 and is pivotally connected to the second end 102 of the telescopic post 100, the other end of the second pushed lever 520 can be linked up with the second linking lever 510 for pushing the second switch 220 disposed on the second end 102 of the telescopic post 100. The operating way of the second linking lever 510 and the second pushed lever 520 of the second adjusting module 500 and the first linking lever 410 and the first pushed lever 420 of the first adjusting module 400 are the same, and will not be described herein again. The second pushed lever 520 also can be directly connected to the second linking lever 510 (not shown). Therefore, the second pushed lever 520 is directly linked up with the second linking lever 510, or the second adjusting module 500 can further includes an assisting rod pivotally connected to the telescopic post 100 and for linked up with the second pushed lever 520 to push the second switch 220, so that the moving track of the second pushed lever 520 can be controlled.

In FIGS. 1 to 4, the adjusting structure can further include a controlling module (not shown) detachably connected to the other end of the wire rope 600 and for linking up with the wire rope 600 to control the adjusting module (such as the first adjusting module 400 or the second adjusting module 500). The controlling module can be a lever or a connecting rod, so that the wire rope 600 can be operated easily for adjusting the height of the seatpost of the bicycle.

Figure 5:
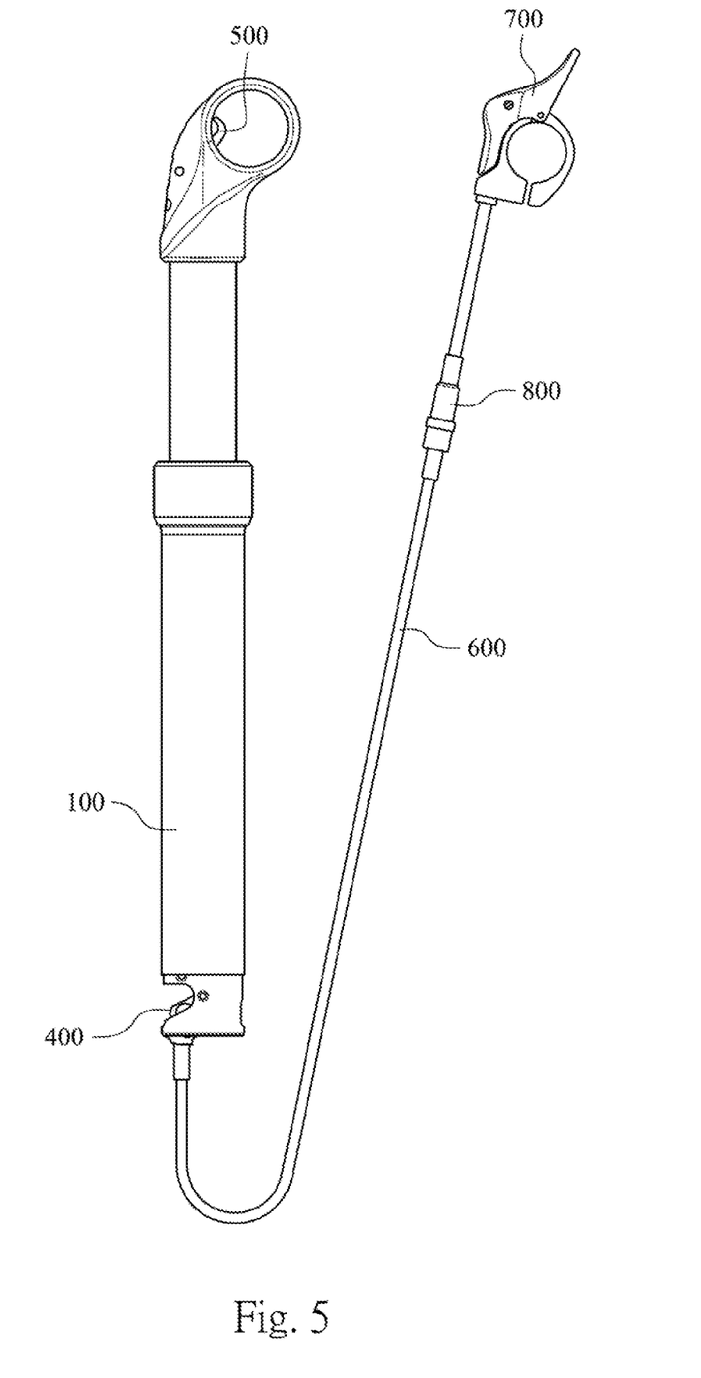
FIG. 5 shows a schematic view of an adjusting structure for a seatpost of a bicycle according to another embodiment of the present disclosure.
Figure 6:
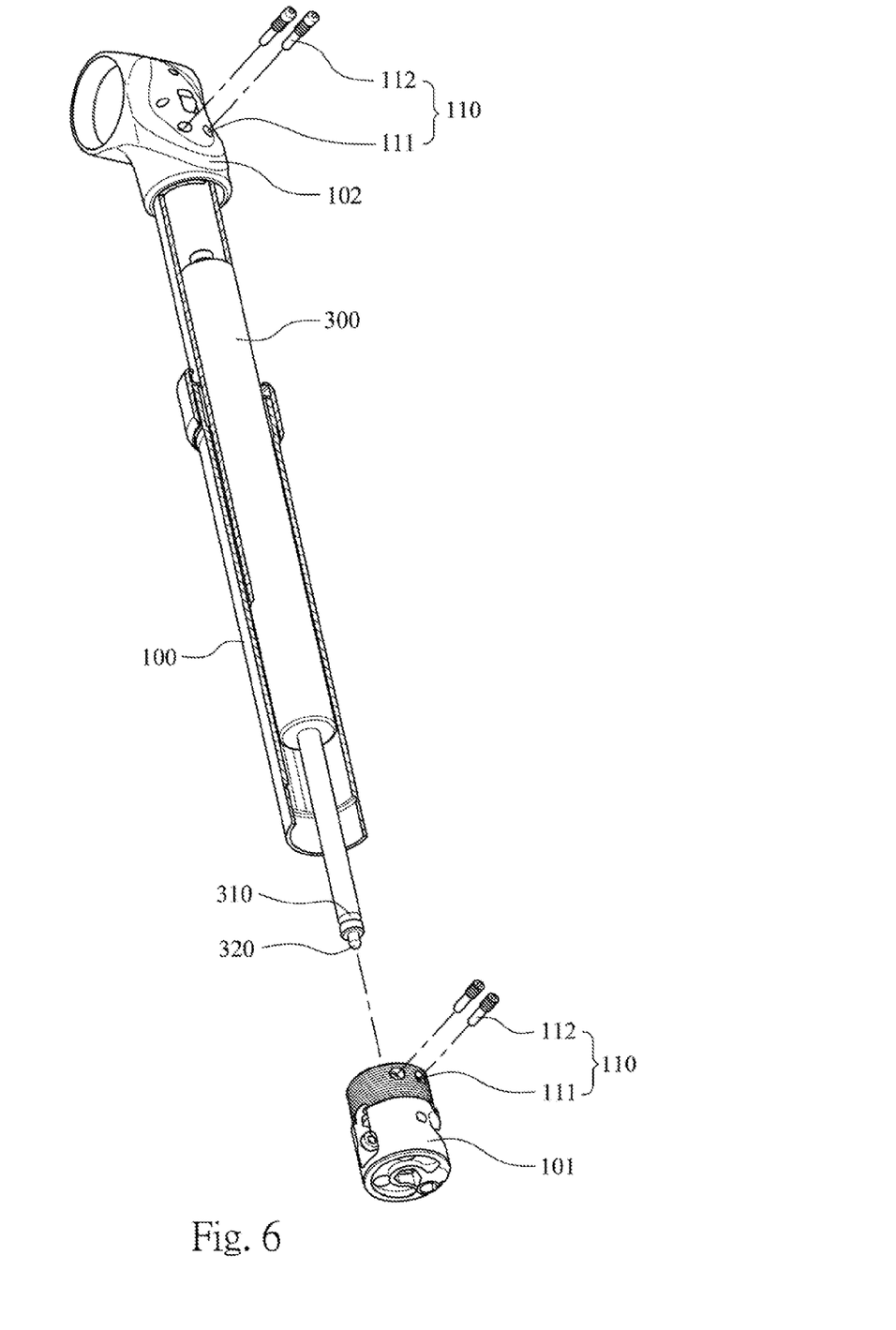
FIG. 6 shows a partial exploded view of the adjusting structure of FIG. 5.
Figure 7:
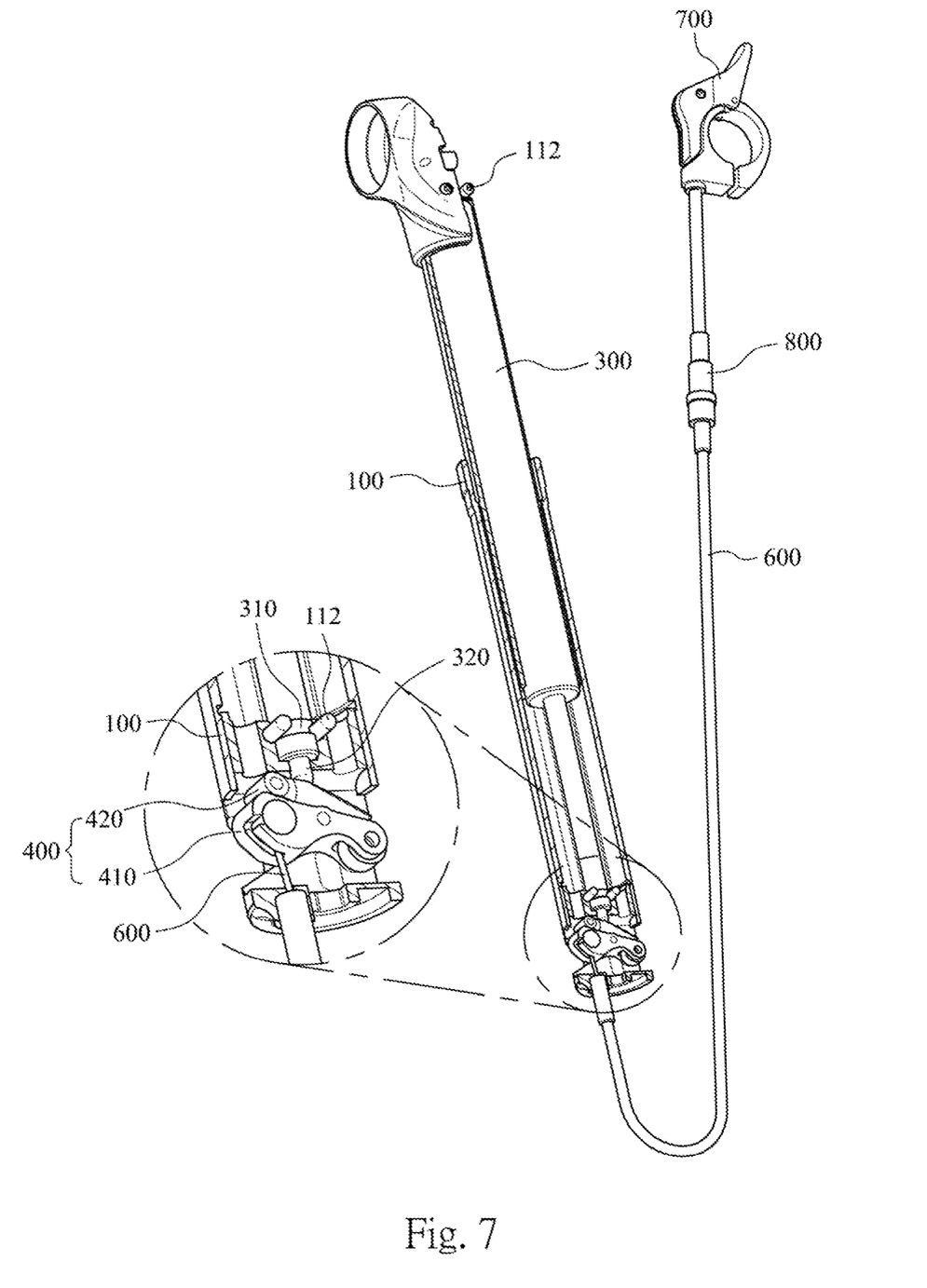
FIG. 7 shows a partial sectional view of the adjusting structure of FIG. 5.

FIG. 5 shows a schematic view of an adjusting structure for a seatpost of a bicycle according to another embodiment of the present disclosure. FIG. 6 shows a partial exploded view of the adjusting structure of FIG. 5. FIG. 7 shows a partial sectional view of the adjusting structure of FIG. 5. The adjusting structure for the seatpost of the bicycle includes a telescopic post 100, a length adjusting module 300 and an adjusting module (such as the first adjusting module 400 in FIG. 5). The telescopic post 100 has a first end 101, the length adjusting module 300 is contained in the telescopic post 100, and two ends of the length adjusting module 300 is leant against two end 101, 102 of the telescopic post 100, respectively. The length adjusting module 300 includes at least one switch 320 for lengthening or shortening the length adjusting module 300. In the embodiment of FIG. 5, the switch 320 of the length adjusting module 300 corresponds to the first end 101 of the telescopic post 100 and is controlled by the first adjusting module 400. The first adjusting module 400 can be a lever, a connecting rod, a cam wheel, a roller or a motor.

In FIGS. 5, 6 and 7, the first adjusting module 400 includes a first linking lever 410 and a first pushed lever 420, wherein the first linking lever 410 is pivotally connected to the first end 101 of the telescopic post 100. One end of the first linking lever 410 is driven to swing the other end of the first linking lever 410, and one end of the first pushed lever 420 is pivotally connected to the first end 101 of the telescopic post 100 and corresponds to the first linking lever 410. The other end of the first pushed lever 420 is linked up with the other end of the first linking lever 410 for pushing the switch 320 of the length adjusting module 300. Therefore, the length adjusting module 300 can be lengthened or shortened for adjusting the height of the seatpost of the bicycle.

In detail, the telescopic post 100 includes two assembling bases 110 located on the first end 101 and the second end 102 thereof, respectively. The length adjusting module 300 includes two assembling units 310 located on the two ends of the length adjusting module 300 which are leant against the first end 101 and the second end 102 of the telescopic post 100, wherein the assembling units 310 are exchangeably connected to the assembling bases 110 of the telescopic post 100, respectively. The switch 320 of the length adjusting module 300 is controlled for lengthening or shortening the length adjusting module 300. Each of the assembling bases 110 includes two assembling holes 111 and two assembling pins 112, wherein each of the assembling pins 112 is located through each of the assembling holes 111 and fastened to each of the assembling units 310 of the length adjusting module 300. In the assembling units 310 and the assembling pins 112, one can be a concave-shaped, the other one can be a convex-shaped, and vice versa. Each assembling pin 112 and each assembling unit 310 are meshed to each other, so that the two end of the length adjusting module 300 can be connected to the telescopic post 100. When the switch 320 of the length adjusting module 300 is pushed and the length of the length adjusting module 300 is adjusted, the length of the telescopic post 100 can also be adjusted.

Further, the adjusting structure can further include a wire rope 600, a controlling module 700 and a fine adjusting module 800. The wire rope 600 is detachably connected to the first linking lever 410 of the first adjusting module 400, the controlling module 700 can pull the wire rope 600 for linking up with the first linking lever 410, wherein the controlling module 700 can be a lever or a connecting rod. The fine adjusting module 800 is assembled on the middle section of the wire rope 600 for adjusting the tension of the wire rope 600.

In FIG. 7, the controlling module 700 is a lever which can be assembled around the handle of the bicycle. When the controlling module 700 is pulled, the wire rope 600 can be pulled for linking up the first linking lever 410 of the first adjusting module 400, so that one end of the first linking lever 410 is driven to swing the other end of the first linking lever 410, and the other end of the first linking lever 410 is linked up with the other end of the first pushed lever 420, thus the other end of the first pushed lever 420 pushes the switch 320. It is easily for pushing the switch 320 of the length adjusting module 300 by the first linking lever 410 and the first pushed lever 420 providing the transformation from the pull of the wire rope 600 to the push against the switch 320. Also, it is convenient for pulling the wire rope via the controlling module 700. Hence, the adjusting structure for the seatpost of the bicycle in the present disclosure is called inner wired type, that is, the switch 320 is pushed via the controlling module 700 from the bottom of the seatpost. The wire rope 600 can be covered by the cover, and there is no need to move the cover during operation, so that the external resistance would not be provided, so that the user can operate in an effort-saving situation.

Furthermore, the adjusting structure can include two adjusting module, one is the first adjusting module 400, the other one is the second adjusting module 500 (shown as FIG. 5) disposed on the second end of the telescopic post 100. When the switch 320 of the length adjusting module 300 corresponds to the second end 102 of the telescopic post 100 or the length adjusting module 300 includes another switch 320 corresponds to the second end 102 of the telescopic post 100, the second adjusting module 500 can push the switch for lengthening or shortening the length adjusting module 300.

The switch 320 of the length adjusting module 300 exchangeably corresponds to the first end 101 or the second end 102 of the telescopic post 100. The assembling pins 112 care be detached from the assembling bases 110, then the first end 101 of the telescopic post 100 can be detached therefrom, so that the position of two end of the length adjusting module 300 can be exchanged, and the switch 320 of the length adjusting module 300 can correspond to the other end of the telescopic post 100.

For exchanging assembling of the length adjusting module 300, one of the two assembling bases 110 detachable from one end of the telescopic post 100 is available. For an example, the assembling base 110 on the first end 101 of the telescopic post 100 is integrated with the telescopic post 100, and the assembling base 110 on the second end 102 of the telescopic post 100 is detachable therefrom, so that the length adjusting module 300 also can be detached and changed the direction.

Figure 8:
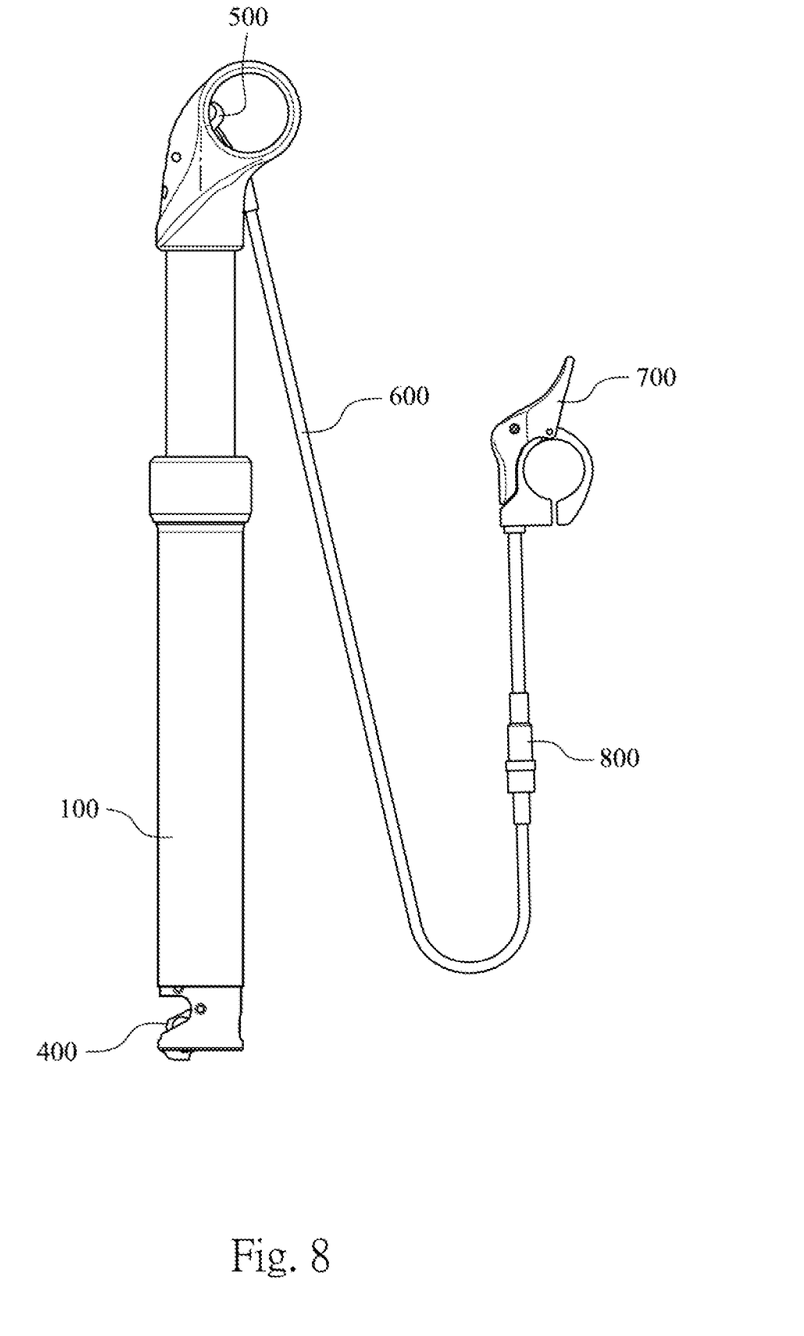
FIG. 8 shows a schematic view of another operating state of the adjusting structure for the seatpost of the bicycle of FIG. 5.
Figure 9:
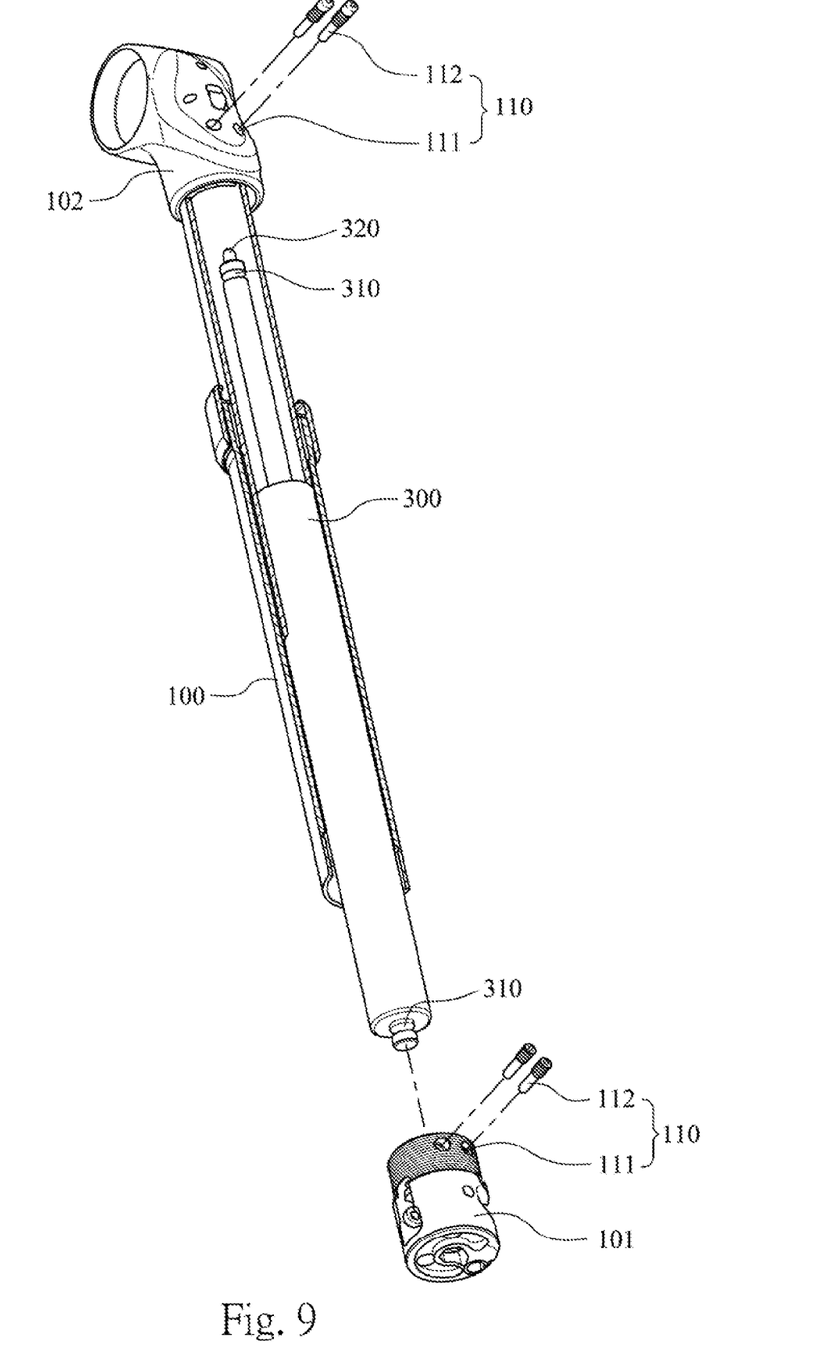
FIG. 9 shows a partial exploded view of the adjusting structure of FIG. 8.
Figure 10:
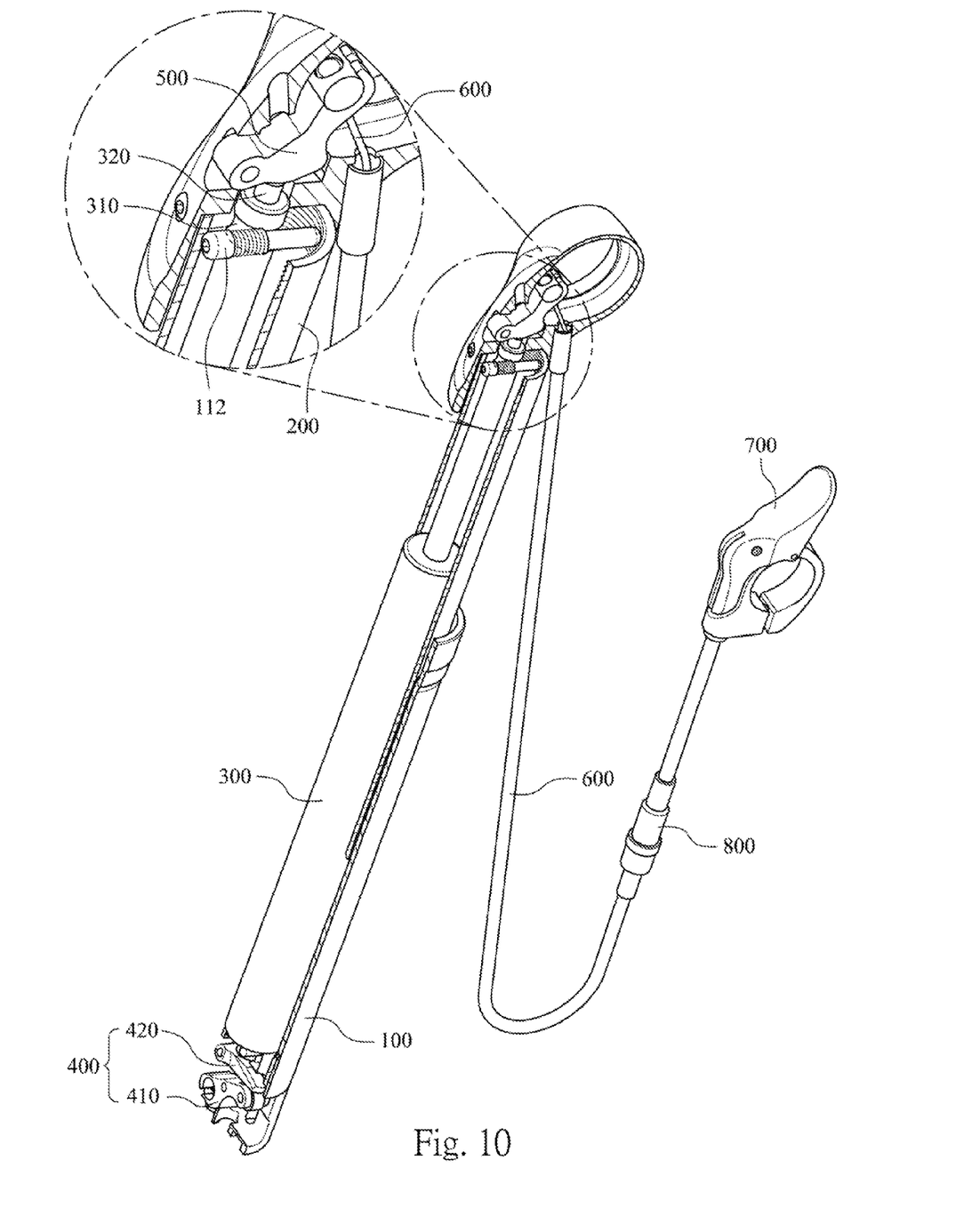
FIG. 10 shows a partial sectional view of the adjusting structure of FIG. 8.

FIG. 8 shows a schematic view of another operating state of the adjusting structure for the seatpost of the bicycle of FIG. 5. FIG. 9 shows a partial exploded view of the adjusting structure of FIG. 8. FIG. 10 shows a partial sectional view of the adjusting structure of FIG. 8.

In FIGS. 8, 9 and 10, the switch 320 of the length adjusting module 300 corresponds to the second end 102 of the telescopic post 100 and is adjacent to the second adjusting module 500. The wire rope 600 is detachably connected to the second adjusting module 500. Therefore, the switch 320 of the length adjusting module 300 can be controlled by the second adjusting module 500. When the controlling module 700 is pulled for pulling the wire rope 600, the second adjusting module 500 can be linked up with the wire rope 600 for pushing the switch 320 of the length adjusting module 300, thus the length of the length adjusting module 300 can be adjusted. The second adjusting module 500 can be a lever for precisely and effort-saving pushing the switch 320. Also, the second adjusting module 500 can be a connecting rod, a cam wheel or a roller.

Figure 11:
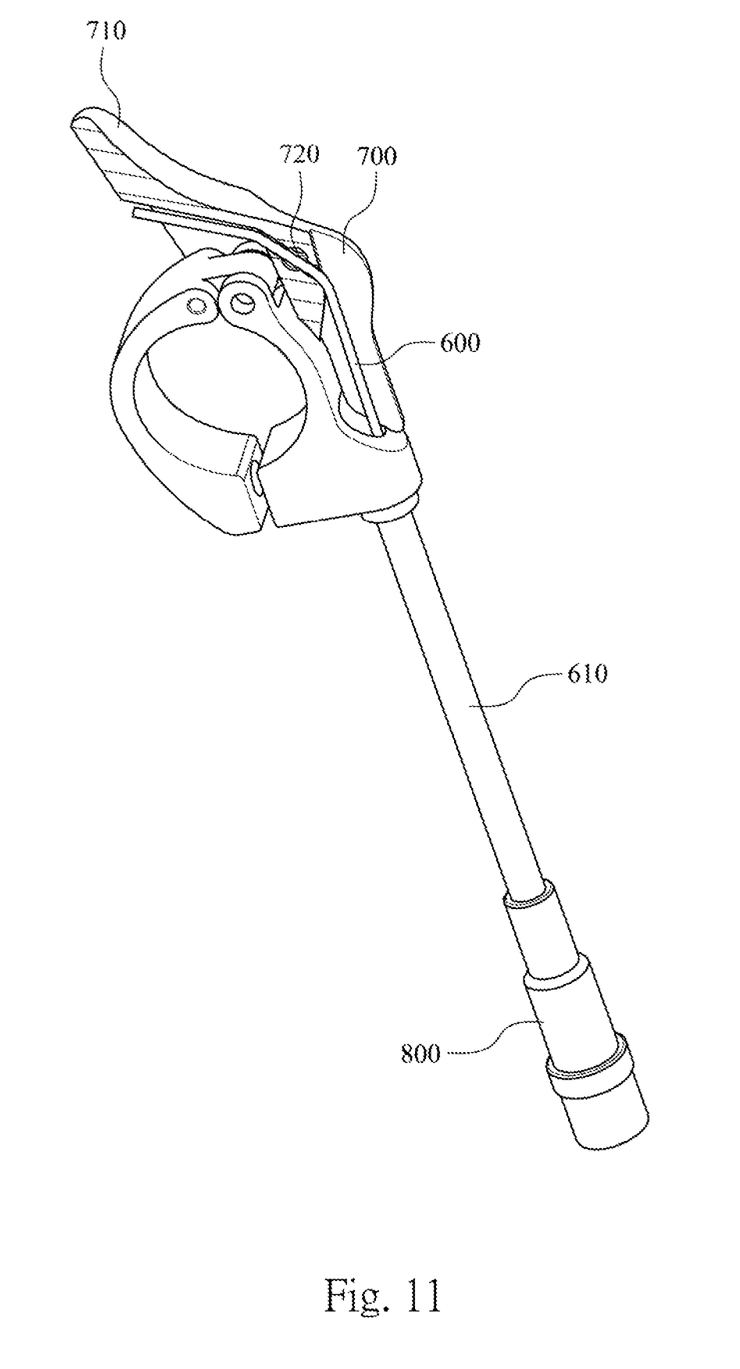
FIG. 11 shows a partial sectional view of the controlling module of the adjusting structure of FIG. 5.

FIG. 11 shows a partial sectional view of the controlling module 700 of the adjusting structure of FIG. 5. In FIG. 11, the controlling module 700 includes a pulling shaft 710 and a fixing element 720, wherein the pulling shaft 710 is for pulling and linking up with the wire rope 600, and the fixing part 720 detachably connects the wire rope 600 and the controlling module 700. The pulling shaft 710 can be a lever or a connecting rod for linking up with the wire rope 600. The fixing part 720 can be (but not limited to) screw thread which can cooperate with a screw for connecting the wire rope 600 with the controlling module 700. The fine adjusting module 800 is for adjusting the tension of the wire rope 600, so that the operating efficiency of the adjusting structure can be enhanced when the first adjusting module 400 or the second adjusting module 500 is driven by the controlling module 700 via the wire rope 600.

The wire rope 600 can be contained in the cover 610 and can be protected from the effect of the environment. The wire rope 600 can be pulled for linking up with the first adjusting module 400 or the second adjusting module 500 for pushing the switch 320 in the cover 610, there is no need to move the cover in the operating state.

Figure 12:
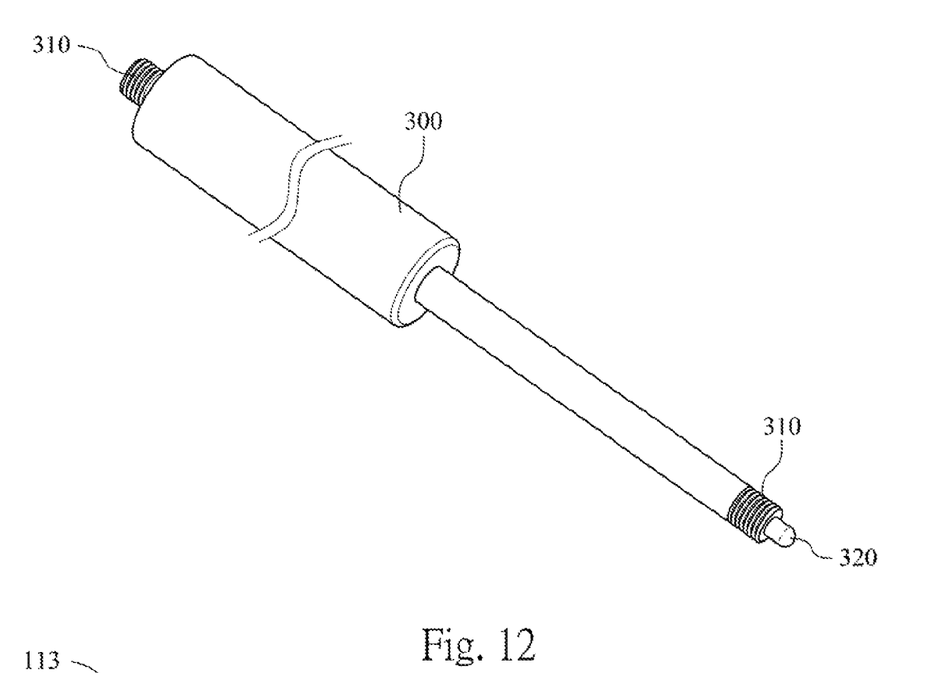
FIG. 12 shows a schematic view of a length adjusting module according to another example of FIG. 5.

FIG. 12 shows a schematic view of a length adjusting module 300 according to another example of FIG. 5. In FIG. 12, the assembling units 310 of the length adjusting module 300 can be screw thread, and the assembling bases 110 which correspond to the screw thread of the assembling units 310 can be screws (not shown). The length adjusting module 300 can be exchanged the direction easily by the screwing cooperation of the assembling units 310 and the assembling bases 110.

Figure 13:
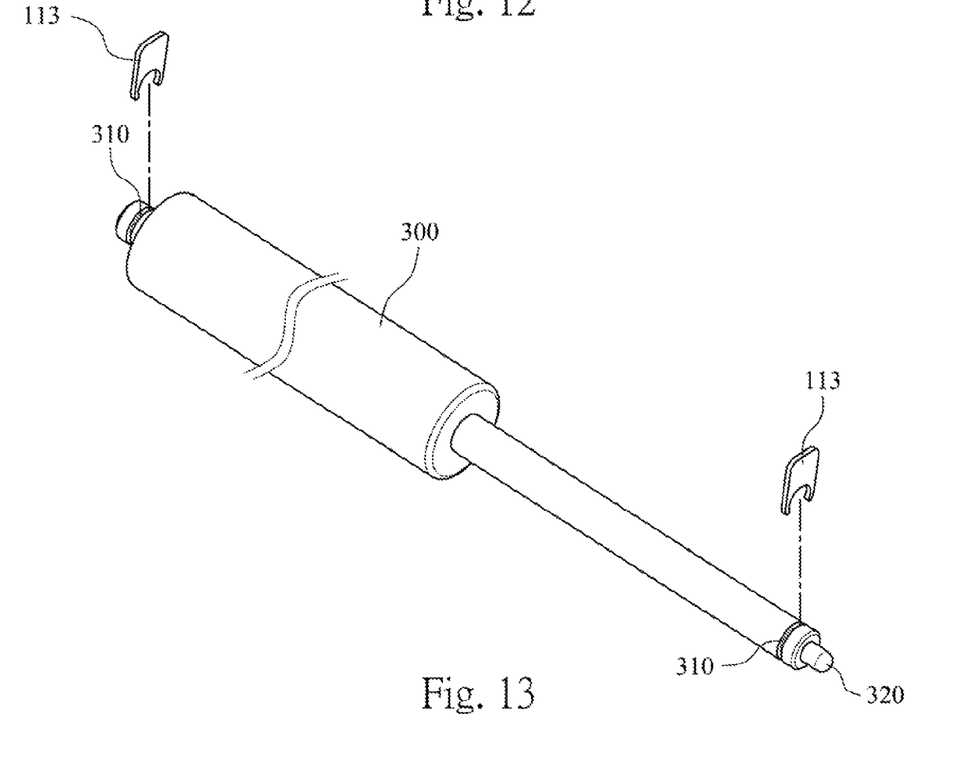
FIG. 13 shows a schematic view of the length adjusting module according to yet another example of FIG. 5.

FIG. 13 shows a schematic view of the length adjusting module 300 according to yet another example of FIG. 5. In FIG. 13, the assembling units 310 of the length adjusting module 300 concave-shaped, and each of the assembling bases (as shown in FIG. 6 and will not be shown in FIG. 13 again) includes an assembling clip 113 disposed in an opening of the assembling bases. The assembling clip 113 can be meshed and fastened with the assembling unit 310, so that the two ends of the length adjusting module 300 can be detachably connected to the first end 101 and the second end 102 of the telescopic post 100. The assembling units 310 and the assembling bases 110 are not limited to the foregoing forms, that is, one of the assembling unit 310 and the assembling base 110 can be concave-shaped, and another one can be convex-shaped, or other forms which can let the assembling units 310 and the assembling bases 110 detachably connected to each other.

Figure 14:
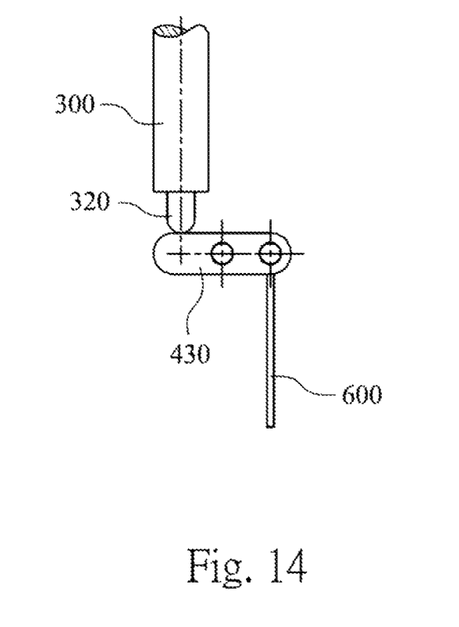
FIG. 14 shows a schematic view of the length adjusting module and the first adjusting module of another example of FIG. 13.

FIG. 14 shows a schematic view of the length adjusting module 300 and the first adjusting module 400 of another example of FIG. 13. In FIG. 14, the first adjusting module 400 is a cam wheel 430, and the wire rope 600 is connected to the cam wheel 430. When the cam wheel 430 is pulled via the wire rope 600, the cam wheel 430 can be rotated and then push the switch of the length adjusting module 300. Similarly, the second adjusting module 500 can also be a cam wheel.

Figure 15:
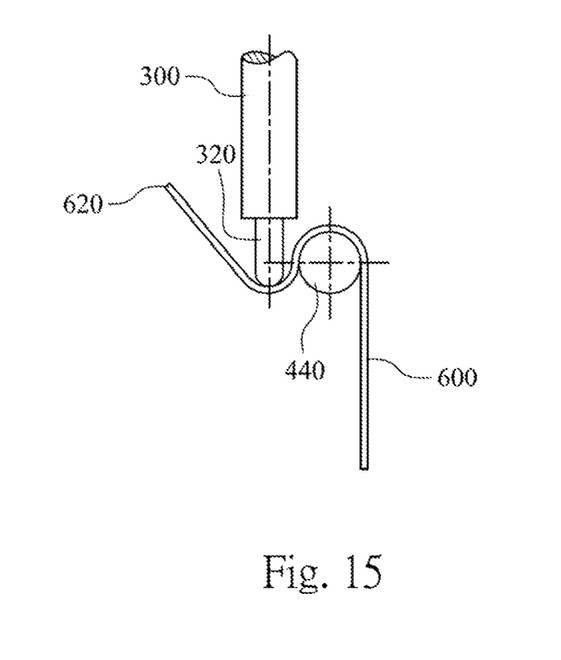
FIG. 15 shows schematic view of the length adjusting module and the first adjusting module of still another example of FIG. 13.

FIG. 15 shows schematic view of the length adjusting module 300 and the first adjusting module 400 of still another example of FIG. 13. In FIG. 15, the first adjusting module 400 is a roller 440, and one end 620 of the wire rope 600 is fixed to the assembling base 110 located on the first end 101 of the telescopic post 100, the other end of the wire rope 600 is coiled around the roller 440. When the wire rope 600 is pulled and slide along the roller 440, the switch 320 of the length adjusting module 300 can be pushed, and the length of the length adjusting module 300 can be adjusted. Similarly, the second adjusting module 500 can also be a roller.

Figure 16:
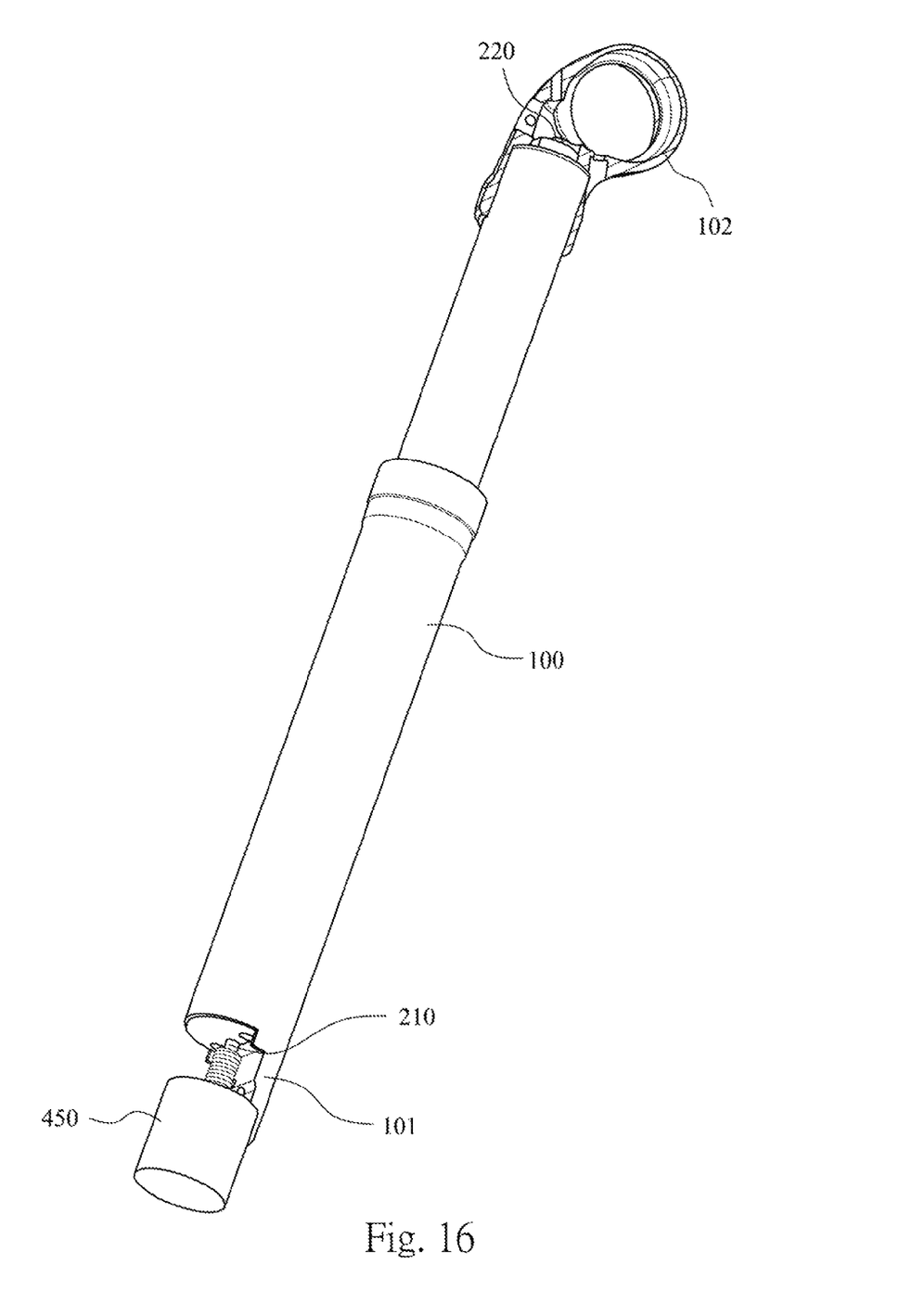
FIG. 16 shows a schematic view of a first adjusting module of another example of FIG. 1.

FIG. 16 shows a schematic view of a first adjusting module 400 of another example of FIG. 1. In FIG. 16, the first adjusting module 400 is a motor for pushing the first switch 210 and the length of the telescopic post 100 can be adjusted. The motor 450 can be controlled by a wired electrical device or a wireless electrical device. Furthermore, the adjusting structure in FIGS. 5 to 10, the first adjusting module 400 can also be a motor 450 for pushing the switch 320 of the length adjusting module 300, and adjusting the length adjusting module 300.

Figure 17:
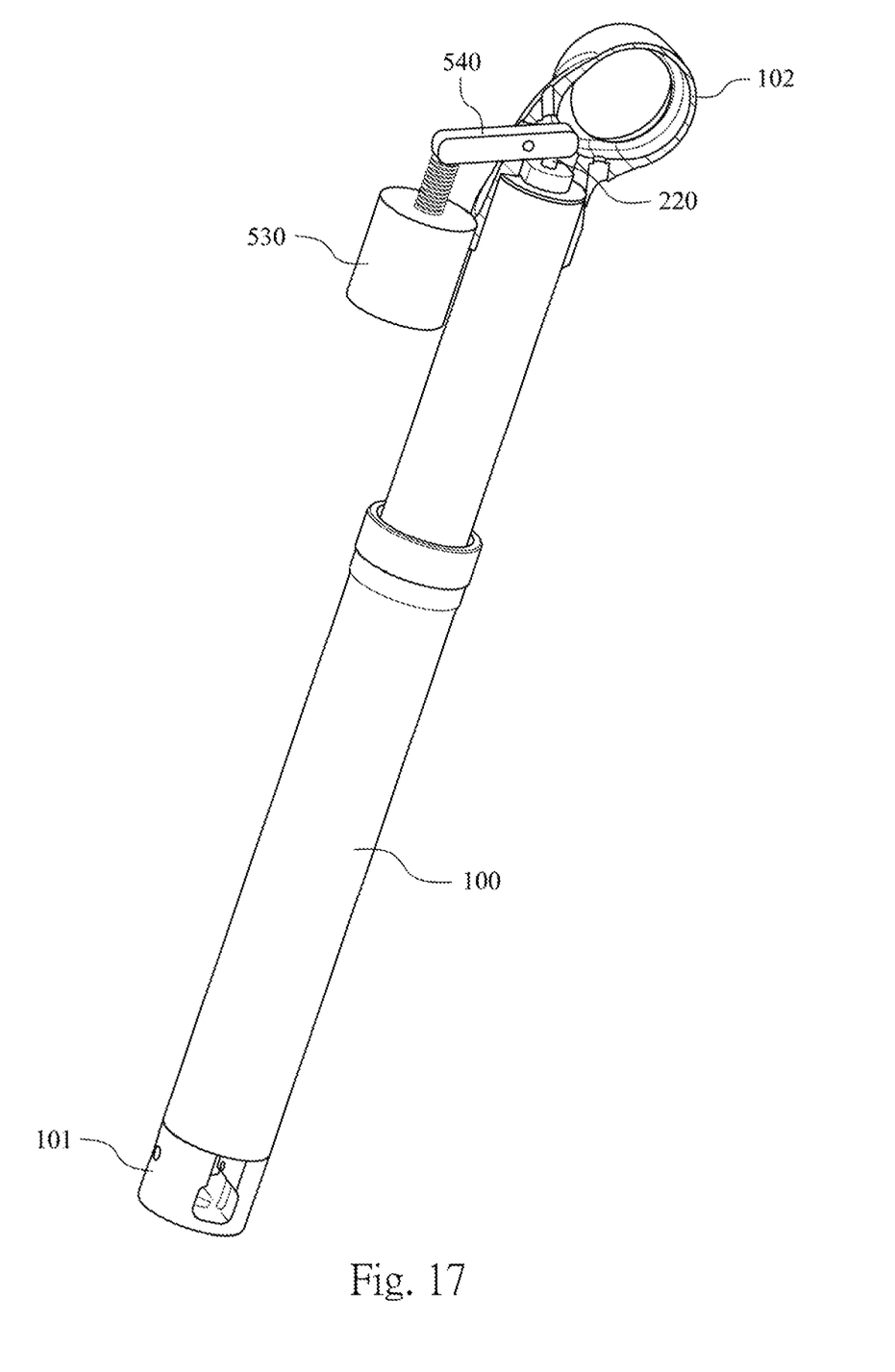
FIG. 17 shows a schematic view of a second adjusting module of another example of FIG. 1.

FIG. 17 shows a schematic view of a second adjusting module 500 of another example of FIG. 1. In FIG. 17, the second adjusting module 500 includes a motor 530 and a linking shaft 540, wherein the linking shaft 540 is pivotally connected to the second end 102 of the telescopic post 100, and the motor 530 is for pushing one end of the linking shaft 540, and the other end of the linking shaft 540 can push the second switch 220. The motor 530 can be controlled by a wired electrical device or a wireless electrical device. Furthermore, the motor 530 and the linking shaft 540 of the second adjusting module 500 can be applied to the adjusting structure of FIGS. 5 to 10. When the motor 530 pushes the linking shaft 540, and the linking shaft 540 pushes the switch 320, the length adjusting module 300 can be lengthened or shortened.

According to the foregoing embodiments and examples, the adjusting structure for the seatpost of the bicycle of the present disclosure has the following advantages.

1. Compatibility: The adjusting structure of the present disclosure can applied on different design of the bicycle, and will not have the problem of noncompatibility.

2. Effort-saving: The adjusting module transforms the pull of the wire rope to the push against the switch, and the cover of the wire rope would not be moved during operation. Therefore, the external resistance would not be provided, and the user can operate in an effort-saving situation.

3. Modularization: The way for pushing the switch is modularized by the cooperation of the adjusting module and the wire rope, so that the war for pushing the switch is easier.

4. Easier operation: By changing direction of the length adjusting module for exchanging the position of the switch, or the detachable wire rope, the way for controlling the switch is easier to change.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. An adjusting structure for a seatpost of a bicycle, comprising:
    a telescopic post comprising at least one switch disposed on one end of the telescopic post, wherein the switch is for lengthening or shortening the telescopic post; and
    at least one adjusting module disposed on the telescopic post corresponding to the switch and for pushing the switch, wherein the adjusting module is a first adjusting module, and the first adjusting module comprises:
        a first pushed lever, one end of the first pushed lever corresponds to the switch; and
        a first linking lever corresponding to the first pushed lever, wherein one end of the first linking lever is driven to swing the other end of the first linking lever, and the other end of the first linking lever is directly linked up with the other end of the first pushed lever, a driven direction of the first linking lever is opposite to a pushing direction of the first pushed lever.

2. The adjusting structure of claim 1, wherein the other end of the first pushed lever pushes the switch.

3. The adjusting structure of claim 1, wherein the first pushed lever is pivotally connected to the telescopic post.

4. The adjusting structure of claim 1, further comprising:
    a wire rope, one end of the wire rope detachably connected to the adjusting module; and
    a controlling module detachably connected to the other end of the wire rope and for linking up with the wire rope to control the adjusting module.

5. The adjusting structure of claim 4, wherein the controlling module is a lever or a connecting rod.

6. The adjusting structure of claim 1, wherein the switch in the telescopic post comprises two switches disposed on two ends of the telescopic post, respectively.

7. The adjusting structure of claim 6, wherein the adjusting structure comprises two adjusting modules correspond to two switches, respectively.

8. The adjusting structure of claim 7, wherein the other one of the adjusting modules is a second adjusting module, the second adjusting module comprises:
a second pushed lever, one end of the second pushed lever corresponds to the other switch; and
a second linking lever, corresponding to the second pushed lever and pivotally connected to the telescopic post, wherein one end of the second linking lever is driven to swing the other end of the second linking lever, and the other end of the second linking lever is linked up with the other end of the second pushed lever, thus the other end of the second pushed lever pushes the switch.

9. The adjusting structure of claim 7, wherein the other one of the adjusting modules is a second adjusting module, the second adjusting module is a lever, a connecting rod, a cam wheel, a roller or a motor.

10. The adjusting structure of claim 7, further comprising:
a wire rope, one end of the wire rope detachably connected to any one of the adjusting modules; and
a controlling module detachably connected to the other end of the wire rope and for linking up with the wire rope to control the adjusting module connected to the wire rope.

11. The adjusting structure of claim 8, wherein the second pushed lever is pivotally connected to the telescopic post.

12. An adjusting structure for a seatpost of a bicycle, comprising:
a telescopic post;
a length adjusting module contained in the telescopic post, two ends of the length adjusting module pushing against two ends of the telescopic post respectively, wherein the length adjusting module comprises at least one switch located on one of the ends of the length adjusting module, the switch is exchangeably disposed on any one of two ends of the telescopic post;
a first adjusting module disposed on one end of the telescopic post and for pushing the switch; and
a second adjusting module disposed on the other end of the telescopic post and for pushing the switch.

13. The adjusting structure of claim 12, wherein the telescopic post comprises two assembling bases, and the length adjusting module comprises two assembling units, wherein the assembling units are exchangeably connected to the assembling bases of the telescopic post, respectively.

14. The adjusting structure of claim 13, wherein one of each assembling base and each assembling unit is concave-shaped, and the other one of each assembling base and each assembling unit is convex-shaped.

15. The adjusting structure of claim 13, wherein each of the assembling bases comprises:
two assembling holes; and
two assembling pins located through the assembling holes respectively and fastened to the assembling units of the length adjusting module respectively.

16. The adjusting structure of claim 13, wherein each of the assembling bases comprises:
an assembling clip disposed on the assembling base for fastening the assembling units.

17. The adjusting structure of claim 13, wherein one of each assembling base and each assembling unit is screw thread, and the other one of each assembling base and each assembling unit is screw thread.

18. The adjusting structure of claim 12, wherein the first adjusting module is a lever, a connecting rod, a cam wheel, a roller or a motor.

19. The adjusting structure of claim 12, wherein the first adjusting module comprises:
a first pushed lever, when the switch corresponds to the first adjusting module, one end of the first pushed lever corresponds to the switch; and
a first linking lever corresponding to the first pushed lever and pivotally connected to the telescopic post, wherein one end of the first linking lever is driven to swing the other end of the first linking lever, and the other end of the first linking lever is linked up with the other end of the first pushed lever, thus the other end of the first pushed lever pushes the switch.

20. The adjusting structure of claim 19, wherein the first pushed lever is pivotally connected to the telescopic post.

21. The adjusting structure of claim 19, wherein the second adjusting module comprises:
a second pushed lever, when the switch corresponds to the second adjusting module, one end of the second pushed lever corresponds to the switch; and
a second linking lever corresponding to the second pushed lever and pivotally connected to the telescopic post, wherein one end of the second linking lever is driven to swing the other end of the second linking lever, and the other end of the second linking lever is linked up with the other end of the second pushed lever, thus the other end of the second pushed lever pushes the switch.

22. The adjusting structure of claim 12, further comprising:
a wire rope, one end of the wire rope detachably connected to the first adjusting module or the second adjusting module.

23. The adjusting structure of claim 22, further comprising:
a controlling module detachably connected to the other end of the wire rope and for linking up with the wire rope to control the first adjusting module or the second adjusting module.

24. The adjusting structure of claim 21, wherein the second pushed lever is pivotally connected to the telescopic post.

25. The adjusting structure of claim 1, wherein a center of the first linking lever is pivotally connected to the telescopic post.

* * * * *